May 10, 1960   F. R. SIMON ET AL   2,936,054
MAGNETICALLY CONTROLLED CLUTCH OF MULTIPLE DISC TYPE
Filed Dec. 21, 1956

*INVENTORS*
*FRANK R. SIMON*
*RICHARD O. PALMER*
BY
*Teller & McCormick*

ATTORNEYS

United States Patent Office 2,936,054
Patented May 10, 1960

2,936,054

MAGNETICALLY CONTROLLED CLUTCH OF MULTIPLE DISC TYPE

Frank R. Simon, Manchester, Conn., and Richard O. Palmer, Shrewsbury, Mass., assignors to The Carlyle Johnson Machine Company, Manchester, Conn., a corporation of Ohio Application December 21, 1956, Serial No. 629,883

7 Claims. (Cl. 192—84)

The invention relates to a clutch of the multiple disc type, wherein pressure is applied to the rotatable multiple disks by a nonrotatable electromagnet which acts directly upon said discs and upon a rotatable but longitudinally movable pressure ring associated with said discs.

The principal object of the invention is to provide a clutch of the type defined having a rotatable buttress ring formed of magnetic metal and interposed between the rotatable discs and the nonrotatable magnet, and also having an antifriction thrust bearing interposed between said buttress ring and said magnet and serving to maintain a small gap between the adjacent faces of said ring and said magnet.

A further object of the invention is to provide a clutch such as aforesaid having means for mechanically separating the discs from each other when engaging pressure is released, such means being particularly important when the discs are magnetically engaged and have residual magnetism tending to resist separation.

A still further object of the invention is to provide various features which are combined with the novel feature already pointed out and which provide a more satisfactory and more reliable clutch.

A still further object of the invention is to provide a clutch of the type defined, wherein said rotatable pressure ring is provided with radial grooves so as to be slightly flexible and so as to be thus adapted to conform to minor variations in the aggregate thickness of the several discs.

Other objects of the invention will be apparent from the drawing and the following description.

The drawing shows in detail a preferred embodiment of the invention, but it will be understood that various changes may be made from the construction shown, and that the drawing is not to be construed as defining or limiting the scope of the invention, the claims forming a part of this specification being relied upon for that purpose.

Figure 1:
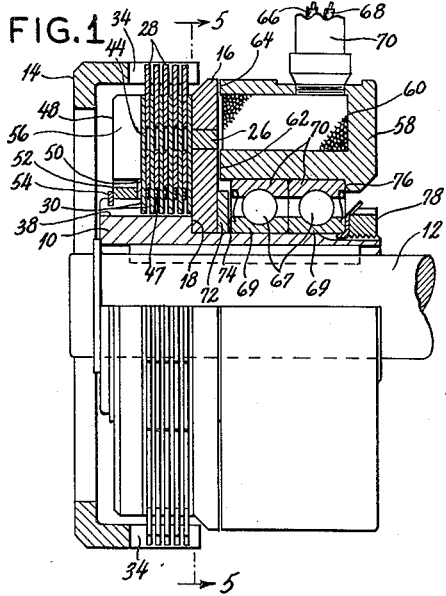
Fig. 1 is a vertical longitudinal sectional view of a clutch embodying the invention.
Figure 2:
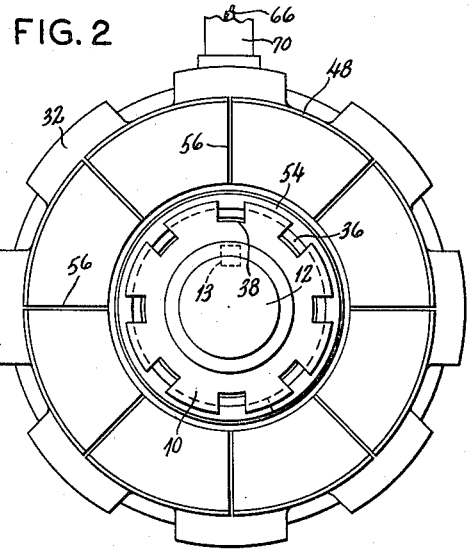
Fig. 2 is an end view of the clutch shown in Fig. 1, but with the driven member omitted.
Figure 3:
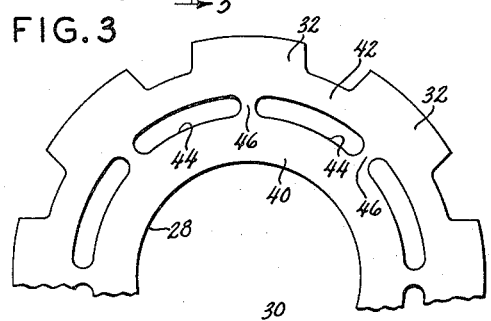
Fig. 3 is a fragmentarmy face view of the outer friction disc.
Figure 4:
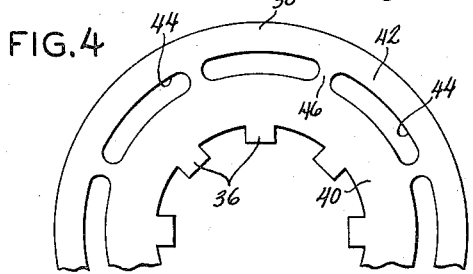
Fig. 4 is a fragmentary face view of one of the inner friction discs.

A clutch embodying the invention is adapted for the transmission of power between the two rotary members having aligned axes. As shown in Fig. 1, one such member is shown at 10, this member being integral or unitary from end to end and being rotatable about a longitudinal axis. The power transmitting member 10 is shown as being a sleeve adapted to be keyed to a shaft 12. The other or second power transmitting member is an annual member 14 which is connected to or formed as a part of any suitable power transmitting means. Power may be transmitted from either member to the other, but for convenience of description it will be assumed that the sleeve 10 on the shaft 12 is the driving member and that the annular member 14 is the driven member. The shaft 12 and the annular member 14 are supported by suitable bearings that are not shown. At least one of the bearings for each member serves to prevent endwise movement.

Figure 5:
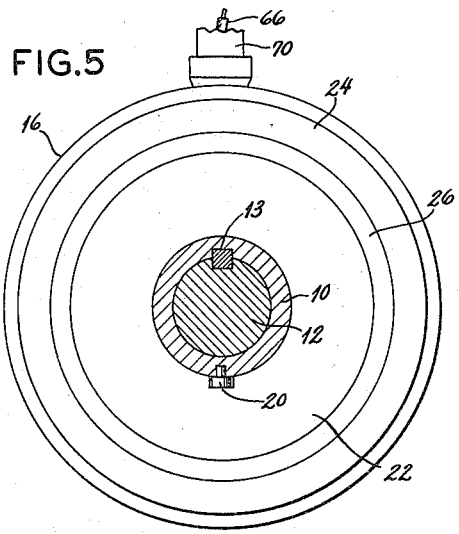
Fig. 5 is a transverse section view taken along the line 5—5 of Fig. 1

A buttress ring 16 is connected with the driving member 10 in such manner as to prevent relative longitudinal movement, and said ring is free to rotate with said member. The ring 16 has its rear face in a radial plane. As shown, the member 10 has a shoulder provided with a rear face 18 and said ring directly engages said face. Preferably the ring is positively connected with said member 10 to ensure rotation therewith, and as shown in Fig. 5 the member 10 carries a pin 20 that enters and fits a spline in the ring.

The ring 16 has spaced inner and outer zones 22 and 24 formed of magnetic metal which are at least to some extent magnetically insulated from each other to prevent or at least restrict the flow of flux from one zone to the other. As shown, said zones are completely insulated from each other and are formed as structurally separate rings of magnetic metal such as mild steel, which last said rings are insulated from each other by an interposed ring 26 of nonmagnetic metal. Said three rings may be connected with each other by press fits or otherwise.

For transmitting power between the members 10 and 14, there are provided interengaging friction discs 28, 28 and 30, 30 which surround the member 10 and which are within the annular member 14. Said discs are adjacent the buttress ring 16 and at the front thereof. Alternate outer discs 28, 28 have outwardly projecting lugs 32, 32 which are adapted to enter longitudinal grooves 34, 34 in the annular member 14. The intervening inner discs 30, 30 have inwardly projecting lugs 36, 36 which enter longitudinal grooves 38, 38 in the member 10. The several discs are frictionally engageable with each other and, when pressure is applied to force said outer and inner discs toward the rear and into firm engagement wgith each other, the said discs serve in the conventional manner to transmit power between the member 10 and the annular member 14.

Each of the discs 28 and 30 is formed of magnetic metal such as mild steel and each of them has spaced inner and outer annular zones 40 and 42 which are at least to some extent magnetically insulated from each other to prevent or at least restrict the flow of flux from one zone to the other. For the buttress ring the insulation between zones is complete, but for the discs it is preferable for structural reasons to provide only one piece of metal for each disc and to provide partial magnetic insulation by an annular series of wide slots 44, 44 with narrow necks 46, 46 between them. The narrow necks 46, 46 permit only limited flow of flux between the zones 40 and 42. Said zones 40 and 42 of the discs are in longitudinal register with the zones 22 and 24 of the buttress plate.

It is important that at least some of the outer end inner discs 28 and 30 be slightly separated when no pressure is applied to them and when no power is to be transmitted. When the discs are magnetically engaged with each other during power transmission, residual magnetism tends to hold the discs in engagement, even after the electromagnet is de-energized. In order to overcome residual magnetism and to mechanically separate the discs, there are provided separator rings 47, 47 as disclosed in Patent 2,217,357 issued October 8, 1940, to Allan R. Coe, which separator rings are interposed between some of the discs. One of the rings 47 is shown in detail in Figs. 6 and 7. As shown, the said rings 47, 47 are located respectively within the outer discs 28, 28 and between the inner discs 30, 30 but the invention is not so limited.

Figures 6, 7:
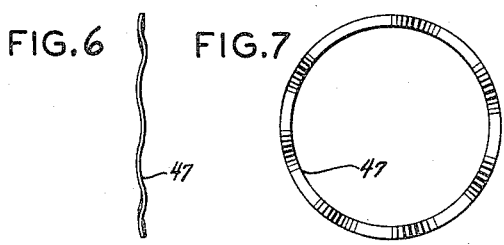
Fig. 6 is a side view of a separator washer.
Fig. 7 is a face view of the separator washer shown in Fig. 6.

The said rings 47, 47 are of wave-like form having alternate humps and depressions on opposite sides, the depressions on one side of each ring being formed by the humps on the opposite side, as shown in Fig. 6 of the drawing. The full thickness of these separator rings from the plane of the humps on one side to the plane of the humps on the opposite side is sufficient to slightly more than fill the spaces between the planes of the sides of the discs 28, 28, so that each ring exerts pressure upon the two discs 30, 30 between which it is located. The result of this construction is that, when the discs are pressed together for power transmitting action, the separating rings 47, 47 are all compressed between the discs 30, 30. The separator rings expand upon release of said pressure and thereby serve to overcome residual magnetism tending to cause disc adherence and to separate said engaged discs. With the rings 47, 47 arranged as shown, each inner disc is positively separated from at least one of the outer discs. The separation of the discs minimizes the dragging effect of one disc upon another, and the clutch promptly terminates its power transmitting action.

Surrounding the driving member 10 and located at the front of the discs is a pressure ring 48 which is ordinarily rotatable with said member 10 but is not necessarily positively connected therewith. Said ring 48 is formed of magnetic metal such as mild steel. As shown, the ring 48 has an inwardly extending narrow flange 50 which centers said ring on said member 10. The annular main body of said ring 48 is much thicker than said flange 50 thereof. A spacer ring 52 abuts against said flange 50 and a snap ring 54 holds the spacer ring in place. The snap ring thus indirectly prevents forward movement of the pressure ring, but said ring is free to move rearwardly to the extent permitted by said discs 28 and 30 and said buttress ring 16.

Figure 8:
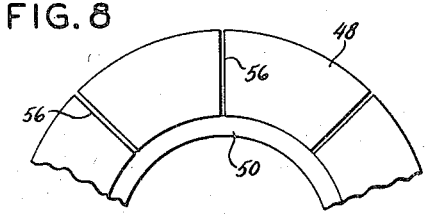
Fig. 8 is a fragmentary face view of the pressure ring.

For a reason to be hereinafter more fully stated, the annular main body of the pressure ring 48 is preferably provided with a plurality of equally spaced radial grooves 56, 56, eight such grooves being shown, and said grooves extend rearwardly from the front face of the ring. Preferably and as more clearly shown in Fig. 8, the grooves 56, 56 constitute slots which extend entirely through the main body of the ring from front to rear, thus providing a plurality of segments that are connected with each other only by the flange 50 which is a continuous inner annular portion of said ring. When the ring is in place the several segments are relatively movable longitudinally within narrow limits.

The several discs 28 and 30 are intended to be replaced at relatively long intervals as the result of unavoidable wear. However, the buttress and pressure rings are not intended to be replaced and they are therefore protected from wear. Said rings are rotated in unison with the driving member 10 and inner discs 30, 30 are therefore provided immediately adjacent said rings, the last said discs being also rotatable in unison with said member 10.

A nonrotary annular electromagnet is provided for the application of pressure to the friction discs 28 and 30. As shown, there is a nonrotary annular magnet housing 58 which surrounds and is concentric with the member 10. The housing 58 is formed from magnetic metal and is shaped to provide an annular chamber open at the front. An annular magnet coil 60 is entered in and fits the annular chamber in the housing. The housing 58 provides inner and outer annular magnetic poles with front faces 62 and 64 in a common radial plane. Said pole faces 62 and 64 are in longitudinal register respectively with the zones 22 and 24 of the buttress ring and the zones 40 and 42 of the friction discs. Current is supplied to the coil 60 by conductors 66 and 68 in a conduit 70. The conduit may serve as means for preventing rotative movement of the magnet.

For accurately locating the magnet housing 58 with respect to the power transmitting member 10 and with respect to the buttress ring 16, there is provided a combined journal and thrust antifriction bearing which is interposed between said housing and said member. As shown, there are two structurally separate anti-friction bearings which are ball bearings having balls 67, 67, each of said bearings having a combined journal and thrust bearing. The said bearings have inner races 69, 69 normally fixedly secured to the member 10 and outer races 70, 70 normally fixedly secured to the magnet housing 58. While the two bearings are structurally separate, they function as a single bearing and they will be hereinafter so referred to.

The inner race 69 of the bearing is in normally fixed abutting relationship at its front end with the buttress ring 16. This abutting relationship is shown as being through a spacer ring 72 and a shim ring 74. A nut 78 has threaded engagement with the member 10 and abuts against the inner bearing race 69 at the rear end thereof. The nut 78 serves to press the inner race forwardly and to hold the several parts in fixed relationship.

The outer race 70 of the bearing is in abutting relationship at its rear end with the magnet housing 58. Preferably said outer race 70 has a press fit in said housing, and the housing has an inwardly projecting annular flange having a front face 76 and said outer race abuts against said face.

The magnet is supported solely by the member 10 and the bearing 67 so far as concerns axial or radial movement and it is free to move axially or radially except as restrained by said member and said bearing.

A switch, not shown, is provided for controlling the flow of current to the magnet coil 60 and when the switch is closed the coil is energized and a magnetic circuit is established. It may be assumed that said magnetic circuit extends from the inner annular magnet pole face 62, through the inner zone 22 of the buttress ring 16, through the inner zones 40 of the several friction discs 28 and 30, through the pressure ring 48, through the outer zones of the several friction discs, through the outer zone of the buttress ring 16 and finally to the outer annular magnet pole face 64. This magnetic circuit serves to draw the pressure ring 48 and the discs 28, 30 toward the rear in opposition to the spring separators 47, 47 with resulting friction between the discs for the transmission of power. When the magnet is de-energized the rings 47, 47 constitute spring means which act to overcome residual magnetism and to separate the friction discs, the pressure ring 48 being moved toward the left.

The buttress plate resists the pressure applied to the discs and prevents any engagement between the rotating discs and the magnet pole faces. By means of the antifriction bearing only a very small gap is maintained between said buttress plate and said magnet with the result that there is only a minimum loss of flux.

The width of the gap between the rear face of the buttress ring 16 and the front pole faces of the magnet is very important and it must be small. Any increase above a small optimum width would seriously restrict the flow of flux and any decrease below the small optimum width might result in direct engagement of the rotating buttress ring with the stationary pole faces. Such direct engagement would result in excessive wear and heating. The optimum width is on the order of .002", and this width is exaggerated in the drawing. The bearings 67, 67 constitute means for preventing longitudinal movement of the magnet relatively to the buttress ring so as to maintain said normally fixed gap.

With usual manufacturing tolerances, it is impossible to machine the several parts with sufficient accuracy to always initially provide the required small gap of about .002". Therefore a means is provided which makes it possible to adjust the width of the gap by longitudinally adjusting the magnet. As shown, this means comprises a replaceable shim 74. The adjustment is effected by disassembling the parts and replacing the shim 74 by another shim that is thinner or thicker.

The main portion of the buttress ring 16 has direct engagement with the member 10, and the outer or peripheral portion is inherently subject to a small rearward deflection under the direct action of the magnet, which action is supplemented by the rearward pressure applied to the buttress ring by the discs 28 and 30 and by the pressure ring 48. The extent of the rearward deflection is dependent upon the dimensions of the ring and also upon the initial width of the gap before deflection. The shim 74 is so chosen that the initial width of the gap at the periphery is as small as is reasonably possible without permitting any actual contact after deflection. The width of the gap after deflection can be on the order of .002" as previously stated.

When the magnet is energized, the discs 28 and 30 will obviously deflect rearwardly to small extents in accordance with the deflection of the buttress ring 16. If the pressure ring 48 were rigid, the discs 28 and 30 would deflect rearwardly away from said ring and the pressure at said discs would be insufficient for maximum power transmission. To avoid this difficulty, the pressure ring 48 has flexibility as the described result of the grooves 56: This enables the pressure ring to conform to the rearward deflection of the several discs and also to conform to minor variations in the aggregate thickness of the said disc. Said ring is therefore enabled to apply pressure substantially uniformly over the areas of said discs. This uniformity of pressure distribution enables the clutch as shown and described to have a maximum power transmitting capacity.

Upon the initial energization of the magnet, the buttress ring has not been deflected and the gap between it and the magnet is of maximum width. By the reason of the maximum width of the gap the magnetic flux is minimum and minimum pressure is applied to the clutch discs with minimum transmitted torque. As the buttress ring 16 and the discs 28 and 30 and the pressure ring 48 deflect rearwardly as the result of the initial action of the magnet, the before described gap decreases in width with a corresponding increase in magnetic flux and a corresponding increase in pressure applied to the discs. This continues until a minimum gap width is attained with a corresponding maximum flux. The maximum flux provides maximum disc pressure and maximum torque.

The invention claimed is:

1. In a clutch of the multiple disc type, the combination of a unitary first power transmitting member rotatable about a longitudinal axis, a buttress ring surrounding said member and connected for rotation therewith, said ring having its rear face initially in a radial plane and said ring having spaced inner and outer annular zones of magnetic metal which are at least to some extent magnetically insulated from each other, a pressure ring surrounding and fitting said power transmitting member at the front of said buttress ring and longitudinally movable rearwardly relatively to said member and said buttress ring which pressure ring is formed of magnetic metal, a series of interengaging friction discs surrounding said power transmitting member and interposed between said buttress and pressure rings, alternate discs being connected with said first power transmitting member for rotation therewith and the intervening discs being connectible with a second power transmitting member which is annular and surrounds said discs and each of said discs being formed of magnetic metal and having spaced inner and outer annular zones which are at least to some extent magnetically insulated from each other and which are in longitudinal register respectively with said annular zones of said buttress ring, a combined journal and thrust antifriction bearing surrounding the first said power transmitting means at the front of the buttress ring which bearing has a rotatable inner race which directly engages the first said power transmitting member and is fixedly connected with said buttress ring and which magnet also has a nonrotatable outer race, and a nonrotatable annular electromagnet surrounding the outer race of the bearing and also surrounding the first said power transmitting member which magnet is fixedly connected with the outer race of said bearing and is free for relative axial or radial movement except as restrained by said bearing and which magnet has inner and outer annular poles with front faces in a radial plane and in longitudinal register respectively with said annular zones of said buttress ring, said magnet being so connected with the bearing that the latter maintains a small gap between the rear face of said rotatable buttress ring and the front pole faces of said nonrotatable magnet whereby with a minimum of loss of flux said magnet when energized will transmit flux through the spaced annular zones of said buttress ring and through the spaced annular zones of said discs and through said pressure ring to draw the last said ring and said discs rearwardly toward said buttress ring with resultant frictional engagement of said discs with each other for the transmission of power.

2. A clutch of the multiple disc type as set forth in claim 1, wherein said first power transmitting member has a rearwardly facing annular shoulder, wherein said buttress ring engages said shoulder, wherein the inner bearing race is adjacent said ring and at the rear thereof and is adapted to apply forward pressure to said ring, and wherein a nut is provided which is adjacent the inner bearing race and at the rear thereof which nut has threaded engagement with said first power transmitting member and serves upon relative rotation to apply forward pressure to said inner bearing race which in turn applies forward pressure to said buttress ring so as to hold it against said rearwardly facing shoulder.

3. In a clutch of the multiple disc type, the combination of a unitary first power transmitting member rotatable about a longitudinal axis, a buttress ring surrounding said member and connected for rotation therewith, said ring having its rear face initially in a radial plane and said ring having spaced inner and outer annular zones of magnetic metal which are at least to some extent magnetically insulated from each other, a pressure ring surrounding and fitting said power transmitting member at the front of said buttress ring and longitudinally movable rearwardly relatively to said member and said buttress ring which pressure ring is formed of magnetic metal, a series of interengaging friction discs surrounding said power transmitting member and interposed between said buttress and pressure rings, alternate discs being connected with said first power transmitting member for rotation therewith and the intervening discs being connectible with a second power transmitting member which is annular and surrounds said discs and each of said discs being formed of magnetic metal and having spaced inner and outer annular zones which are at least to some extent magnetically insulated from each other and which are in longitudinal register respectively with said annular zones of said buttress ring, a nonrotatable annular electromagnet surrounding the first said power transmitting member at the front of said buttress ring and having inner and outer annular poles with front faces in a radial plane and in longitudinal register respectively with said annular zones of said buttress ring, means for preventing longitudinal movement of the electromagnet relatively to the buttress ring so as to maintain a normally fixed small gap between the rear face of said ring and the front pole faces of said electromagnet, and means enabling the electromagnet to be longitudinally adjusted relatively to the pressure ring so as to cause said gap to have a suitable small width.

4. A clutch of the multiple disc type as set forth in claim 3, wherein the means for preventing relative longitudinal movement of the electromagnet is an antifriction bearing having an outer race fixedly connected with the electromagnet and having an inner race connected with said first power transmitting member, and means enabling the inner race to be longitudinally adjusted relatively to the last said member so as to thereby longitudinally adjust the electromagnet.

5. A clutch of the multiple disc type as set forth in claim 4, wherein the means enabling the inner race to be longitudinally adjusted is a replaceable shim interposed between said inner bearing race and said buttress ring.

6. In a clutch of the multiple disc type, the combination of a unitary first power transmitting member rotatable about a longitudinal axis, a buttress ring surrounding said member and connected for rotation therewith, said ring being slightly deflectable rearwardly and having its rear face initially in a radial plane and said ring having spaced inner and outer annular zones of magnetic metal which are at least to some extent magnetically insulated from each other, a pressure ring surrounding and fitting said power transmitting member at the front of said buttress ring and longitudinally movable rearwardly relatively to said member and said buttress ring which pressure ring is formed of magnetic metal and has grooves therein which provide flexibility, a series of thin slightly flexible interengaging friction discs surrounding said power transmitting member and interposed between said buttress and pressure rings, alternate discs being connected with said first power transmitting member for rotation therewith and the intervening discs being connectible with a second power transmitting member which is annular and surrounds said discs and each of said discs being formed of magnetic metal and having spaced inner and outer annular zones which are at least to some extent magnetically insulated from each other and which are in longitudinal register respectively with said annular zones of said buttress ring, a nonrotatable annular electromagnet surrounding the first said power transmitting member at the front of said buttress ring and having inner and outer annular poles with front faces in a radial plane and in longitudinal register respectively with said annular zones of said buttress ring, and a bearing interposed between said rotatable buttress ring and said nonrotatable magnet for maintaining a small gap between the rear face of said rotatable buttress ring and the front pole faces of said nonrotatable magnet whereby said magnet when energized will transmit flux through the spaced annular zones of said buttress ring and through the spaced annular zones of said discs and through said pressure ring to draw the last said ring and said discs rearwardly toward said buttress ring with resultant rearward deflection of said buttress ring and of said discs and of said pressure ring so as to provide engagement of said discs with each other at maximum pressure for the transmission of power.

7. In a clutch of the multiple disc type, the combination of a unitary first power transmitting member rotatable about a longitudinal axis, a buttress ring surrounding said member and connected for rotation therewith, said ring having spaced inner and outer annular zones of magnetic metal which are at least to some extent magnetically insulated from each other, a pressure ring surrounding and fitting said power transmitting member at the rear of said buttress ring and longitudinally movable relatively to said member and buttress ring which pressure ring is formed of magnetic metal, a series of interengaging friction discs surrounding said power transmitting member and interposed between said buttress and pressure rings, alternate discs being connected with said power transmitting member for rotation therewith and the intervening discs being connectible with a second power transmitting member which is annular and surrounds said discs and each of said discs being formed of magnetic metal and having spaced inner and outer annular zones which are at least to some extent magnetically insulated from each other and which are in longitudinal register respectively with said annular zones of said buttress ring, a combined journal and thrust antifriction bearing surrounding the first said power transmitting means at the front of the buttress ring which bearing has a rotatable inner race which directly engages the first said power transmitting member and is fixedly connected with said buttress ring and which magnet also has a nonrotatable outer race, a nonrotatable annular electromagnet surrounding the outer race of the bearing and also surrounding the first said power transmitting member which magnet is fixedly connected with the outer race of said bearing and is free for relative axial or radial movement except as restrained by said bearing and which magnet has inner and outer annular poles with front faces in a radial plane and in longitudinal register respectively with said annular zones of said buttress ring, said magnet being so connected with the bearing that the latter maintains a small gap between the rear face of said rotatable buttress ring and the front pole faces of said nonrotatable magnet whereby with a minimum of loss of flux said magnet when energized will transmit flux through the spaced annular zones of said buttress ring and through the spaced annular zones of said discs and through said pressure ring to draw the last said ring and said discs toward said buttress ring with resultant frictional engagement of said discs with each other for the transmission of power, and resilient separator rings interposed between and engaged with some of said friction discs which separator rings are compressed so long as magnetic flux is transmitted to apply pressure for effecting engagement of the discs and which separator rings expand upon release of said pressure and thereby serve to overcome residual magnetism tending to cause disc adherence and to separate said engaged discs and minimize drag.

References Cited in the file of this patent

UNITED STATES PATENTS

| | | |
|---|---|---|
| 2,217,357 | Coe | Oct. 8, 1940 |
| 2,344,111 | Ryba | Mar. 14, 1944 |
| 2,375,783 | Gilfillan | May 15, 1945 |
| 2,418,466 | Drake | Apr. 8, 1947 |
| 2,549,214 | Lilja | Apr. 17, 1951 |
| 2,618,368 | Hoover | Nov. 18, 1952 |
| 2,623,619 | Clerk | Dec. 30, 1952 |
| 2,816,454 | Hosea et al. | Dec. 17, 1957 |

FOREIGN PATENTS

| | | |
|---|---|---|
| 708,182 | France | Apr. 27, 1931 |
| 1,075,486 | France | Apr. 14, 1954 |
| 184,786 | Austria | Feb. 25, 1956 |
| 541,444 | Italy | Mar. 29, 1956 |
| 1,134,433 | France | Dec. 3, 1956 |